(12) United States Patent
Kihara et al.

(10) Patent No.: US 9,798,043 B2
(45) Date of Patent: Oct. 24, 2017

(54) OPTICAL FIBER, OPTICAL FIBER CABLE AND COMMUNICATION EQUIPMENT

(71) Applicant: Mitsubishi Rayon Co., Ltd., Chiyoda-ku, Tokyo (JP)

(72) Inventors: Hideki Kihara, Toyama (JP); Akinori Ishikado, Toyama (JP); Yoshihiro Tsukamoto, Toyama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 15/111,581

(22) PCT Filed: Jan. 16, 2015

(86) PCT No.: PCT/JP2015/051016
§ 371 (c)(1),
(2) Date: Jul. 14, 2016

(87) PCT Pub. No.: WO2015/111506
PCT Pub. Date: Jul. 30, 2015

(65) Prior Publication Data
US 2016/0334548 A1    Nov. 17, 2016

(30) Foreign Application Priority Data

Jan. 23, 2014    (JP) .................................. 2014-010042

(51) Int. Cl.
*G02B 6/02* (2006.01)
*G02B 6/44* (2006.01)
(Continued)

(52) U.S. Cl.
CPC ............ *G02B 1/048* (2013.01); *C03C 25/104* (2013.01); *C08F 20/22* (2013.01); *C08L 33/12* (2013.01);
(Continued)

(58) Field of Classification Search
CPC .............. G02B 6/02395; G02B 6/4401; G02B 6/02033; G02B 6/02; G02B 1/048;
(Continued)

(56) References Cited

U.S. PATENT DOCUMENTS 4,566,755 A * 1/1986 Ohmori ................. C08F 220/22
385/145
5,093,889 A * 3/1992 Kubo ................. G02B 6/02033
385/142

(Continued)

FOREIGN PATENT DOCUMENTS

JP    S63-248807 A    10/1988
JP    S63-249112 A    10/1988
(Continued)

OTHER PUBLICATIONS

International Search Report issued in corresponding International Patent Application No. PCT/JP2015/051016 dated Apr. 14, 2015.

*Primary Examiner* — Akm Enayet Ullah
(74) *Attorney, Agent, or Firm* — Morgan, Lewis & Bockius LLP

(57) ABSTRACT

Provided is an optical fiber which has exceptional heat resistance and is highly safe. This optical fiber has a core, and a sheath of a least one layer around the outside circumference of the core, the sheath including a polymer that contains a repeating unit (A) derived from a fluoroalkyl (meth)acrylate having a specific structure.

17 Claims, 1 Drawing Sheet

(51) Int. Cl.
  *C08F 20/22* (2006.01)
  *C08L 33/12* (2006.01)
  *C08L 33/16* (2006.01)
  *G02B 1/04* (2006.01)
  *C03C 25/10* (2006.01)
(52) U.S. Cl.
  CPC .......... *C08L 33/16* (2013.01); *G02B 6/02033* (2013.01); *G02B 6/02042* (2013.01); *G02B 6/02395* (2013.01); *G02B 6/4401* (2013.01)
(58) Field of Classification Search
  CPC ......... G02B 1/04; C03C 25/104; C08F 20/22; C08L 33/12; C08L 33/16
  USPC ................... 385/128, 139, 140–147
  See application file for complete search history.

(56) References Cited

U.S. PATENT DOCUMENTS

| | | | |
|---|---|---|---|
| 5,148,511 A * | 9/1992 | Savu | ............... C03C 25/105 385/145 |
| 8,932,666 B2 * | 1/2015 | Tahira | ............... B41J 2/06 427/66 |

FOREIGN PATENT DOCUMENTS

| | | |
|---|---|---|
| JP | H02-043507 A | 2/1990 |
| JP | H04-298514 A | 10/1992 |
| JP | 2002-156533 A | 5/2002 |
| JP | 2003-084148 A | 3/2003 |
| JP | 2003-139973 A | 5/2003 |
| JP | 2004-252401 A | 9/2004 |

* cited by examiner

OPTICAL FIBER, OPTICAL FIBER CABLE AND COMMUNICATION EQUIPMENT

FIELD OF THE INVENTION

The present invention relates to an optical fiber, optical fiber cable and communication equipment.

BACKGROUND ART

Optical fibers are used in wide varieties of applications such as optical transmission equipment, lighting, ornamentation, and displays. Glass optical fibers have excellent optical transmission properties in a wide range of wavelengths; however, their processability and mechanical characteristics are not so excellent. By contrast, plastic optical fibers are structured, for example, by coating the periphery of a core made of a highly transparent resin such as polymethyl methacrylate with a highly transparent resin having a refractive index lower than that of the core. Compared with glass optical fibers, plastic optical fibers have excellent flexibility, processability and the like.

On the other hand, plastic optical fibers are often used under high-temperature conditions as optical information transmission equipment in automobiles and the like, and thus higher heat resistance is required. Patent Literature 1 proposes plastic optical fibers produced by using resin containing a repeating unit derived from 2-(perfluorooctyl)ethyl methacrylate as the material for cladding formed on the periphery of the core.

PRIOR ART LITERATURE

Patent Literature

Patent Literature 1: JP2003-139973A

SUMMARY OF THE INVENTION

Problems to be Solved by the Invention

Although heat resistance of the plastic optical fiber proposed in Patent Literature 1 has shown improvement, further improvement is necessary. In addition, during the production process of the material for forming 2-(perfluorooctyl)ethyl methacrylate, controlled substances such as perfluorooctanesulfonic acid listed as a Class I Specified Chemical Substance and perfluorooctanoic acid listed as a Type II Monitoring Chemical Substance may be generated as byproducts or the like.

The objective of the present invention is to provide an optical fiber that exhibits excellent heat resistance and meets higher safety standards.

Solutions to the Problems

The present invention is described in [1]~[17] below.
[1] An optical fiber having a core and at least one cladding layer formed on the periphery of the core, in which the cladding contains a polymer having a repeating unit (A) derived from fluoroalkyl (meth)acrylate represented by formula (1) or (2) below.

[chemical formula 1]

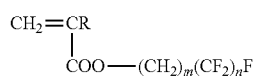

(1)

(In formula (1), "m" is an integer of 1 or 2, "n" is an integer of 5~7, and "R" indicates a hydrogen atom or a methyl group.)

[chemical formula 2]

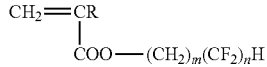

(2)

(In formula (2), "m" is an integer of 1 or 2, "n" is an integer of 5~8, and "R" indicates a hydrogen atom or a methyl group.)
[2] The optical fiber described in [1], in which fluoroalkyl (meth)acrylate represented by formula (1) or (2) is fluoroalkyl (meth)acrylate represented by formula (1).
[3] The optical fiber described in [1], in which fluoroalkyl (meth)acrylate represented by formula (1) or (2) is 2-(perfluorohexyl)ethyl methacrylate.
[4] The optical fiber described in any of [1]~[3], in which a polymer to form the cladding further contains a repeating unit (B) derived from fluoroalkyl (meth)acrylate represented by formula (3) below.

[chemical formula 3]

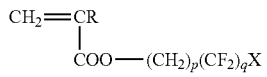

(3)

(In formula (3), "p" is an integer of 1 or 2, "q" is an integer of 1~4, "R" indicates a hydrogen atom or a methyl group, and "X" indicates a hydrogen atom or fluorine atom.)
[5] The optical fiber described in any of [1]~[4], in which a polymer to form the cladding further contains a repeating unit (C) derived from alkyl (meth)acrylate that does not include a fluorine atom.
[6] The optical fiber described in any of [1]~[5], in which a polymer to form the cladding further contains a repeating unit (D) derived from a hydrophilic monomer.
[7] The optical fiber described in [4], in which a polymer to form the cladding contains the following relative to 100 mass % of the polymer: 15~60 mass % of a repeating unit (A) derived from fluoroalkyl (meth)acrylate represented by formula (1) or (2), 20~70 mass % of a repeating unit (B) derived from fluoroalkyl (meth)acrylate represented by formula (3), 10~30 mass % of a repeating unit (C) derived from alkyl (meth)acrylate that does not include a fluorine atom, and 0.1~10 mass % of a repeating unit (D) derived from a hydrophilic monomer.
[8] The optical fiber described in any of [1]~[3], in which a polymer to form the cladding contains the following relative to 100 mass % of the polymer: 10~50 mass % of a repeating unit (A) derived from fluoroalkyl (meth)acrylate represented by formula (1) or (2), 40~80 mass % of a repeating unit (C) derived from alkyl (meth)acrylate that does not include a fluorine atom, and 0.1~10 mass % of a repeating unit (D) derived from a hydrophilic monomer.
[9] The optical fiber described in [6], in which a polymer to form the cladding contains at least 1.5 mass % of a repeating unit (D) derived from a hydrophilic monomer relative to 100 mass % of the polymer.

[10] The optical fiber described in any of [1]~[9], in which the glass transition temperature (Tg) (° C.) of a polymer to form the cladding and the refractive index (n) of the polymer satisfy formula (4) below.

$$Tg \geq 375 \times n - 455 \quad (4)$$

[11] The optical fiber described in any of [1]~[10], having only one cladding layer.
[12] The optical fiber described in any of [1]~[10], having two or more cladding layers.
[13] The optical fiber described in any of [1]~[12], having one core.
[14] The optical fiber described in any of [1]~[12], having multiple cores.
[15] An optical fiber cable, having the optical fiber described in any of [1]~[14] and a jacket layer formed on the periphery of the optical fiber.
[16] The optical fiber cable described in [15], in which the jacket layer contains polyolefin resin or chlorinated polyolefin resin at 50 mass % or greater.
[17] Communication equipment containing the optical fiber described in any of [1]~[14].

Effects of the Invention

According to the present invention, an optical fiber, which exhibits excellent heat resistance and meets higher safety standards, is provided.

MODE TO CARRY OUT THE INVENTION

[Optical Fiber]
An optical fiber related to the present invention has a core and at least one cladding layer on the periphery of the core. Examples are step-index optical fibers, multistep-index optical fibers, graded-index optical fibers, multicore optical fibers and the like. Among those, step-index optical fibers and multicore optical fibers are preferred because of their excellent heat resistance, and step-index optical fibers are more preferred because of their longer transmission capabilities.

Figure 1:
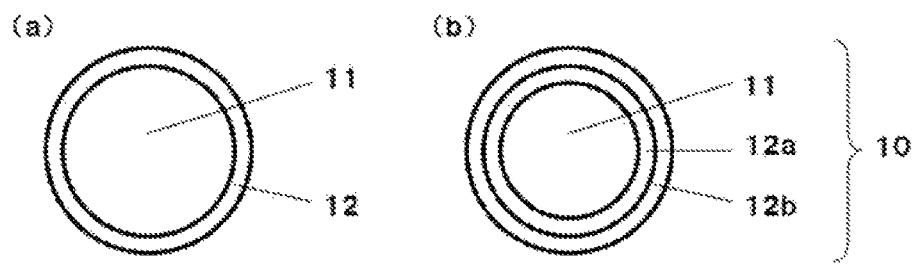
FIG. 1 schematically shows cross-sectional views of step-index optical fibers as examples of the optical fiber related to the present invention.

In a step-index optical fiber, total reflection of light occurs at the interface of the core and the cladding, and the light propagates through the core. Examples of a step-index optical fiber are a type having core 11 and one layer of cladding 12 formed on the periphery of core 11 as shown in FIG. 1(a), another type having core 11 and two cladding layers 12a, 12b on the periphery of core 11 as shown in FIG. 1(b), and the like. The number of cladding layers may be one, or two or greater.

Figure 2:
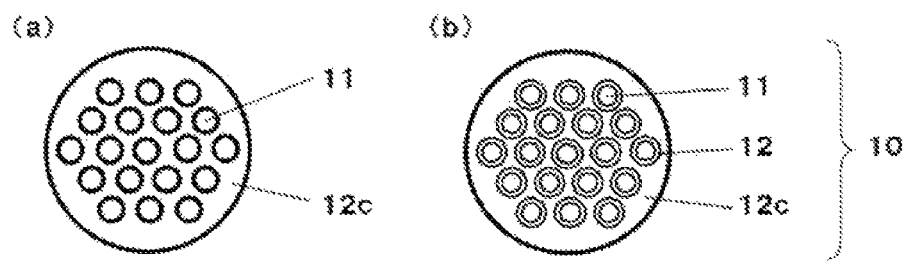
FIG. 2 schematically shows cross-sectional views of multicore optical fibers as examples of the optical fiber related to the present invention.

In a multicore optical fiber, total reflection of light occurs at the interface of the core and the cladding, and the light propagates through multiple cores. Examples of a multicore optical fiber are a type formed by surrounding multiple cores 11 collectively with one sheath (sea portion) 12c as shown in FIG. 2(a), another type formed to have multiple cores 11 each covered by cladding 12 on the periphery and all the multicores 11 further surrounded collectively by one sheath (sea portion) 12c as shown in FIG. 2(b), and the like. The number of cores may be one, or two or greater.

(Core)
The material for forming a core (hereinafter referred to as core material) is not limited specifically as long as it is highly transparent, and may be appropriately selected according to usage purposes or the like. Examples of highly transparent material are glass and resins such as acrylic resins, styrene resins and carbonate resins. Such highly transparent materials may be used alone or in combination thereof. Among those highly transparent materials, resins are preferred because of their excellent flexibility. Acrylic resins are more preferred because of their longer transmission capabilities.

Examples of acrylic resins are methyl methacrylate homopolymers (PMMA), copolymers containing at least 50 mass % of a repeating unit derived from methyl methacrylate, and the like. They may be used alone or in combination thereof. Among them, because of excellent optical and mechanical characteristics, heat resistance, and transparent properties, methyl methacrylate homopolymers and copolymers containing at least 50 mass % of a repeating unit derived from methyl methacrylate are preferred, more preferably methyl methacrylate homopolymers and copolymers containing at least 60 mass % of a repeating unit derived from methyl methacrylate, even more preferably methyl methacrylate homopolymers and copolymers containing at least 70 mass % of a repeating unit derived from methyl methacrylate, especially preferably methyl methacrylate homopolymers. In the present application, (meth)acrylate means acrylate or methacrylate.

For producing a core material, bulk polymerization, suspension polymerization, emulsion polymerization, solution polymerization or the like may be employed. Among them, bulk polymerization and solution polymerization are preferred, since impurities are suppressed from being mixed in.
(Cladding)
At least one layer of cladding is formed on the periphery of a core. The material for forming cladding (hereinafter referred to as "cladding material") contains a polymer that includes a repeating unit (A) derived from fluoroalkyl (meth)acrylate represented by formula (1) or (2) below (hereinafter referred to as a "monomer unit (A)") (such a polymer is referred to as a "polymer"). The cladding material may be made of the polymer.

[chemical formula 4]

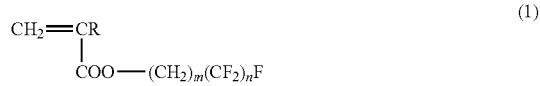

(1)

(In formula (1), "m" is an integer of 1 or 2, "n" is an integer of 5~7, and "R" indicates a hydrogen atom or a methyl group.)

[chemical formula 5]

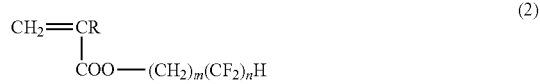

(2)

(In the formula, "m" is an integer of 1 or 2, "n" is an integer of 5~8, and "R" indicates a hydrogen atom or a methyl group.)

The monomer to form a monomer unit (A) is fluoroalkyl (meth)acrylate represented by formula (1) or (2) above. Examples of fluoroalkyl (meth)acrylate represented by formula (1) above are 2-(perfluorohexyl)ethyl (meth)acrylate, 2-(perfluoropentyl)ethyl (meth)acrylate, 2-(perfluoroheptyl) ethyl (meth)acrylate, and the like. Examples of fluoroalkyl (meth)acrylate represented by formula (2) above are 1H,1H, 9H-hexadecafluorononyl (meth)acrylate, 1H,1H,7H-dodecafluoroheptyl (meth)acrylate, and the like. Such monomers to form a monomer unit (A) may be used alone or in combination thereof. Among those listed above, fluoroalkyl (meth)acrylate represented by formula (1) above is preferred because of the ease of producing a monomer, more preferably 2-(perfluorohexyl)ethyl (meth)acrylate, even more preferably 2-(perfluorohexyl)ethyl methacrylate, because of lower production cost and excellent heat resistance and mechanical characteristics provided for optical fibers.

In addition to a monomer unit (A), the polymer is preferred to further contain a repeating unit (B) derived from fluoroalkyl (meth)acrylate represented by formula (3) below (hereinafter referred to as a "monomer unit (B)") in view of the heat resistance and mechanical characteristics of optical fibers.

[chemical formula 6]

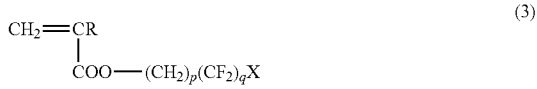

(3)

(In formula (3), "p" is an integer of 1 or 2, "q" is an integer of 1~4, "R" indicates a hydrogen atom or a methyl group, and "X" indicates a hydrogen atom or fluorine atom.)

The monomer to form a monomer unit (B) is fluoroalkyl (meth)acrylate represented by formula (3) above. Specific examples fluoroalkyl (meth)acrylate represented by formula (3) above are 2,2,2-trifluoroethyl (meth)acrylate, 2,2,3,3-tetrafluoropropyl (meth)acrylate, 2,2,3,3,3-pentafluoropropyl (meth)acrylate, 2,2,3,4,4,4-hexafluorobutyl (meth)acrylate, 1H,1H,5H-octafluoropentyl (meth)acrylate, 2-(perfluorobutyl)ethyl (meth)acrylate, and the like. They are used alone or in combination thereof. Among those listed above, because of the ease of producing a monomer, preferred monomers to form a repeating unit (B) are 2,2,2-trifluoroethyl (meth)acrylate, 2,2,3,3-tetrafluoropropyl (meth)acrylate, 2,2,3,3,3-pentafluoropropyl (meth)acrylate, and 2,2,3,4,4,4-hexafluorobutyl (meth)acrylate, whereas 2,2,2-trifluoroethyl (meth)acrylate and 2,2,3,3,3-pentafluoropropyl (meth)acrylate are more preferred, even more preferably 2,2,2-trifluoroethyl methacrylate and 2,2,3,3,3-pentafluoropropyl methacrylate, because of lower production cost and excellent heat resistance and mechanical characteristics provided for optical fibers.

In addition to a monomer unit (A), the polymer is preferred to further contain a repeating unit (C) derived from alkyl (meth)acrylate that does not include a fluorine atom (hereinafter referred to as a "monomer unit (C)") from the viewpoints of polymerization reactions, production cost, and the heat resistance and mechanical characteristics of optical fibers.

A monomer to form a monomer unit (C) is alkyl (meth) acrylate that does not include a fluorine atom. Examples are methyl (meth)acrylate, ethyl (meth)acrylate, n-propyl (meth)acrylate, iso-propyl (meth)acrylate, n-butyl (meth) acrylate, iso-butyl (meth)acrylate, sec-butyl (meth)acrylate, tert-butyl (meth)acrylate, n-hexyl (meth)acrylate, cyclohexyl (meth)acrylate, n-octyl (meth)acrylate, 2-ethylhexyl (meth)acrylate, dodecyl (meth)acrylate, tridecyl (meth)acrylate, stearyl (meth)acrylate, isobornyl (meth)acrylate, adamantyl (meth)acrylate, and the like. Those monomers may be used alone or in combination thereof to form a monomer unit (C). Among those listed above, methyl (meth)acrylate is preferred, more preferably methyl methacrylate, because of the ease of producing the monomer at a lower cost, while excellent polymerization reactions are achieved, and excellent heat resistance and mechanical characteristics are provided for optical fibers.

In addition to a monomer unit (A), the polymer is preferred to further contain a repeating unit (D) derived from a hydrophilic monomer (hereinafter referred to as a "monomer unit (D)") to achieve excellent adhesiveness between the core and cladding, while providing excellent heat resistance for optical fibers. Here, the "hydrophilic" property of a hydrophilic monomer means greater affinity with water. A hydrophilic monomer is preferred to include a carboxyl group, hydroxyl group or epoxy group. A monomer unit (C) is set to exclude a hydrophilic monomer unit (D).

The monomer to form a monomer unit (D) is a hydrophilic monomer; and examples are (meth)acrylic acid, 2-hydroxyethyl (meth)acrylate, 2-hydroxypropyl (meth)acrylate, 3-hydroxypropyl (meth)acrylate, 2-hydroxybutyl (meth) acrylate, 3-hydroxybutyl (meth)acrylate, 4-hydroxybutyl (meth)acrylate, glycidyl (meth)acrylate, and the like. Those monomers may be used alone or in combination thereof to form a monomer unit (D). Among those listed above, (meth)acrylic acid is preferred, more preferably methacrylic acid, because excellent adhesiveness of the core and cladding is achieved, and excellent heat resistance is provided for optical fibers.

In addition to a monomer unit (A), the polymer may contain a repeating unit (E) derived from a monomer other than monomer units (A)~(D) (hereinafter referred to as a "monomer unit (E)") if applicable.

The monomer to form a monomer unit (E) may be any monomer as long as it is copolymerizable with the monomer to form a monomer unit (A), and is also copolymerizable with monomers to form respectively monomer units (B), (C) and (D), when applicable. However, 2-(perfluorooctyl)ethyl (meth)acrylate is excluded as a monomer for forming a monomer unit (E).

Examples of a monomer to form a monomer unit (E) are olefins such as ethylene, propylene, butene, and isobutene; fluorine-containing olefins such as vinylidene fluoride, trifluoroethylene, tetrafluoroethylene, hexafluoropropylene, and chlorotrifluoroethylene; aromatic vinyls such as styrene and α-methylstyrene; and the like. Those monomers may be used alone or in combination thereof to form a monomer unit (E).

The mixing rate of each monomer in a polymer may be selected appropriately according to the type of core and desired characteristics of optical fibers.

When a polymer contains a monomer unit (A), monomer unit (B), monomer unit (C) and monomer unit (D), relative to 100 mass % of the polymer, the polymer is preferred to contain 15~60 mass % of a monomer unit (A), 20~70 mass % of a monomer unit (B), 10~30 mass % of a monomer unit (C), and 0.1~10 mass % of a monomer unit (D), more preferably 25~50 mass % of a monomer unit (A), 30~55 mass % of a monomer unit (B), 15~25 mass % of a monomer unit (C), and 0.1~5 mass % of a monomer unit (D), because excellent adhesiveness of the core and cladding is achieved, and excellent heat resistance and mechanical characteristics are provided for optical fibers.

When a polymer contains a monomer unit (A), monomer unit (C) and monomer unit (D), relative to 100 mass % of the polymer, the polymer is preferred to contain 10~50 mass % of a monomer unit (A), 40~80 mass % of a monomer unit (C), and 0.1~10 mass % of a monomer unit (D), more preferably 15~40 mass % of a monomer unit (A), 60~80 mass % of a monomer unit (C), and 0.1~5 mass % of a monomer unit (D), because excellent heat resistance and transmission bandwidth are provided for optical fibers.

When a polymer contains a monomer unit (D), relative to 100 mass % of the polymer, a monomer unit (D) is preferred to be contained at 1.5 mass % or greater, more preferably 1.6 mass % or greater, but 5 mass % or less. When a monomer unit (D) is contained at such a rate, excellent adhesiveness of the core and cladding is achieved, and excellent heat resistance is provided for optical fibers.

When a polymer contains a monomer unit (E), relative to 100 mass % of the polymer, a monomer unit (E) is preferred to be contained at 10 mass % or less, more preferably 5 mass % or less. When a monomer unit (E) is contained at such a rate, the original properties of optical fibers are not impaired. It is an option for a polymer not to contain a monomer unit (E).

The mass average molecular weight of a polymer is preferred to be 30000~600000, more preferably 50000~400000. Mass average molecular weights are the values measured through high performance liquid chromatography.

When a polymer contains a repeating unit derived from another monomer in addition to a monomer unit (A), it is an option for the cladding material to contain a copolymer that includes a repeating unit derived from the monomer, or to contain a polymer mixture that includes a repeating unit derived from the monomer. However, considering the ease of production, containing a copolymer is preferred.

From the viewpoint of the heat resistance and mechanical characteristics of an optical fiber, the glass transition temperature (Tg) (° C.) of a polymer and refractive index (n) of the polymer are preferred to satisfy formula (4) below. Here, the glass transition temperature (Tg) (° C.) of a polymer and refractive index (n) of the polymer are the values measured by the methods described later.

$$Tg \geq 375 \times n - 455 \quad (4)$$

When an optical fiber includes multiple claddings, since the cladding material containing a polymer that includes a monomer unit (A) exhibits excellent transparency, flexibility and heat resistance and provides excellent heat resistance and mechanical characteristics for the optical fiber, it is preferred to be positioned to directly coat the core. For example, if it is a step-index optical fiber shown in FIG. 1(b), the cladding material containing a polymer that includes a monomer unit (A) is preferred to be used as cladding 12a which directly coats core 11. In addition, if it is a multicore optical fiber shown in FIG. 2(b), the cladding material containing a polymer that includes monomer unit (A) is preferred to be used as cladding 12 which directly coats each core 11.

In an optical fiber with two cladding layers, if the first layer (inner layer, cladding 12a in FIG. 1(b)) is formed with a cladding material that contains a polymer that includes a monomer unit (A), the cladding material for the second layer (outer layer, cladding 12b in FIG. 1(b)) is not limited specifically, as long as its refractive index is lower than that of the first layer. However, considering lower cost and excellent transparency, flexibility, impact endurance and chemical resistance, the following are preferred: vinylidene fluoride (VDF) homopolymers, VDF-trifluoroethylene copolymers, VDF-tetrafluoroethylene (TFE) copolymers, VDF-hexafluoropropylene (HFP) copolymers, VDF-TFE-HFP copolymers, VDF-TFE-HFP-(perfluoro)alkyl vinyl ether copolymers, VDF-hexafluoroacetone copolymers, VDF-TFE-hexafluoroacetone copolymers, ethylene-VDF-TFE-HFP copolymers, and ethylene-TFE-HFP copolymers. Among those, more preferred are VDF-TFE copolymers, VDF-HEP copolymers, VDF-TFE-HFP copolymers, ethylene-VDF-TFE-HFP copolymers, and ethylene-TFE-HFP copolymers.

(Method for Producing Optical Fiber)

To produce an optical fiber, a melt-spinning method, for example, is employed. Since optical fibers are produced by a simplified process, a melt-spinning method is preferred. Production of a step-index optical fiber by a melt-spinning method is conducted, for example, by melting core material and cladding material and by conjugate spinning the materials.

When optical fibers are used under conditions that undergo significant temperature differences, optical fibers are preferred to be annealed to prevent pistoning. Conditions for annealing optical fibers may be selected appropriately according to the materials used for optical fibers. Annealing may be performed continuously or by batch.

(Diameter)

The diameter of an optical fiber is preferred to be 0.1~5 mm, more preferably 0.2~4.5 mm, even more preferably 0.3~4 mm, because handling optical fibers of such a size is easier, while coupling efficiency with optical devices and tolerance to imperfect alignment of optical axes are excellent.

Considering coupling efficiency with optical devices and tolerance to imperfect alignment of optical axes, the diameter of the core in a step-index optical fiber is preferred to be at least 85%, more preferably at least 90%, even more preferably at least 95%, of the diameter of the step-index optical fiber. The diameter of the core is preferred to be set at no greater than 99.99% of the diameter of a step-index optical fiber.

In a step-index optical fiber, the thickness of cladding is preferred to be no greater than 15%, more preferably no greater than 10%, even more preferably no greater than 5%, of the diameter of the step-index optical fiber, considering coupling efficiency with optical devices and tolerance to imperfect alignment of optical axes. The thickness of a cladding is set to be at least 0.01% of the diameter of the step-index optical fiber.

When a step-index optical fiber has two cladding layers, the first layer and the second layer may be set to have any thickness ratio. When there are two cladding layers, the thickness ratio of the first and second layers (first layer versus second layer) is preferred to be 1:0.1~1:5, more preferably 1:0.5~1:4, even more preferably 1:1~1:3, because the optical fiber exhibits excellent flexibility, impact endurance and chemical resistance, while coupling efficiency with optical devices and tolerance to imperfect alignment of optical axes are high.

(Refractive Index)

The refractive indices of the core and cladding are not limited specifically as long as the refractive index of the cladding is lower than that of the core. However, since the numerical aperture can be set greater relative to the maximum angle for the entered light to propagate, the refractive index of core material is preferred to be 1.45~1.55 while the refractive index of cladding material is set at 1.35~1.51; more preferably the refractive index is preferred to be 1.46~1.53 for core material and 1.37~1.49 for cladding material; even more preferably 1.47~1.51 for core material and 1.39~1.47 for cladding material. Here, refractive indices are measured at 25° C. by using sodium D lines.

(Usage)

Since optical fibers related to the present invention exhibit excellent heat resistance and meet higher safety standards, they are suitable for use in various applications such as communication equipment, illumination, ornamentation, display and the like, especially suitable when used in communication equipment.

[Optical Fiber Cable]

An optical fiber cable related to the present invention is made up of an optical fiber related to the present invention and a jacket layer formed on the periphery of the optical fiber.

Examples of the material for forming a jacket layer are polyolefin resins such as polyethylene resin and polypropylene resin; chlorinated resins such as vinyl chloride resin and chlorinated polyolefin resin; fluorine resins; urethane resins; styrene resins; polyamide resins; and the like. Those materials may be used alone or in combination thereof in the jacket layer. Among those listed, polyolefin resins, chlorinated resins and polyamide resins are preferred, more preferably polyolefin resins, vinyl chloride resins, chlorinated polyolefin resins and polyamide resins, because of excellent mechanical characteristics provided for optical fiber cables.

A jacket layer may be single or double or more.

[Communication Equipment]

Communication equipment related to the present invention uses optical fibers related to the present invention. Examples of communication equipment are FA equipment; OA equipment; mobile devices; audio devices; LANs; industrial robotics; optical information transmission equipment inside trains, aircraft, automobiles and the like; sensors; and so on.

EXAMPLES

In the following, the present invention is described in detail by referring to examples. However, the present invention is not limited to those examples.

(Measuring Refractive Index)

The refractive index of cladding material prepared in each production example was measured with an Abbe refractometer (Model No. "NAR-3T," made by Atago Co., Ltd.) at 25° C. by using sodium D lines.

(Measuring Glass Transition Temperature)

The glass transition temperature (Tg) of cladding material prepared in each production example was measured with a differential scanning calorimeter (Model No. "DSC-200" made by Seiko Instruments Inc.) More specifically, 10 mg of cladding material was placed in a measuring pan and melted by raising the temperature to 200° C. at a rate of 50° C./min. and keeping it at that temperature for 5 minutes. Then, the measuring pan was put on dry ice for quick cooling to solidify the cladding material, and the temperature was raised from 25° C. to 200° C. at a rate of 10° C./min. The glass transition temperature was determined from the shoulder value. Glass transition temperatures are used as an index to determine heat resistance properties of optical fibers.

(Measuring Transmission Loss)

Regarding the optical fibers and optical fiber cables prepared in Examples and Comparative Examples, transmission loss (dB/km) was measured through a 25 m-1 m cutback method conducted by using light with a wavelength of 650 nm and by setting a numerical aperture (NA) of 0.1 for the light to enter.

Measurements through a 25 m-1 m cutback method were conducted in accordance with IEC 60793-1-40:2001. In particular, a 25 m-long optical fiber or optical fiber cable was set in a measuring device and its output power $P_2$ was measured. Then, the optical fiber or optical fiber cable was cut into a cutback length (1 m from the end where light enters) and its output power $P_1$ was measured. Transmission loss of light was calculated by using the following formula (1).

[mathematical formula 1]

$$\text{transmission loss (dB/km)} = \frac{10 \times \log(P_1/P_2)}{0.025 - 0.001} \quad (1)$$

(Measuring Number of Repeated Bendings)

The number of repeated bendings was measured as follows in accordance with IEC 60794-1:1993. More specifically, a 4 m-long optical fiber cable was placed on a repeated bending test machine (optical fiber flexing tester with thermostatic bath, made by Yasuda Seiki Seisakusho, Ltd.), and a load of 500 gf (4.9N) was applied on one end of the cable, while the center point of the cable was clamped by two 15 mm-diameter circular tubes. The other end of the fiber cable was moved toward one of the circular tubes until the fiber cable was wrapped on the periphery of the tube, making a 90-degree angle. Then, the fiber cable was moved toward the other circular tube until the fiber cable was wrapped on the periphery of the other tube, making a 90-degree angle, which means the cable was bent a total of 180 degrees. Those bending procedures were repeated. The test was finished when an increase of 1 dB in transmission loss from the initial value was observed. The number of repeated bendings was confirmed at the time of test completion.

Production Example 1

Production Example 1 was prepared by mixing 35 parts by mass of 2-(perflurohexyl)ethyl methacrylate, 47 parts by mass of 2,2,2-trifluoroethyl methacrylate, 17 parts by mass of methyl methacrylate, 1 part by mass of methacrylic acid, 0.05 parts by mass of 2,2'-azobis(isobutyronitrile), 0.05 parts by mass of 2,2'-azobis(2,4-dimethylvaleronitrile), and 0.037 parts by mass of n-octyl mercaptan. A nitrogen gas was blown into the mixture and bubbled for an hour. Next, the mixture solution was poured into a sealed polymerization vessel, which was kept in a 65° C. bath for 5 hours. Then, the polymerization vessel was kept in a 120° C. steam dryer for 2 hours, and a polymer composition was obtained. The polymer composition was melt-kneaded using a vented single-screw extruder while residual monomers and the like were removed. Accordingly, cladding material (A) made of the polymer was prepared.

Production Examples 2~7

Cladding materials (B)~(G) were each prepared the same as in Production Example 1 except that the monomer composition of raw material to form the cladding was modified as shown in Table 1.

Production Examples 8, 9

Cladding materials (H)~(I) were each prepared the same as in Production Example 1 except that the amount of n-octyl mercaptan was changed to 0.285 parts by mass and the monomer composition of raw material to form the cladding was modified as shown in Table 1.

TABLE 1

|  |  | 2-(perfluorohexyl) ethyl methacrylate (mass %) | 2-(perfluorooctyl) ethyl methacrylate (mass %) | 2,2,2-trifluoro ethyl methacrylate (mass %) | methyl methacrylate (mass %) | methacrylic acid (mass %) |
|---|---|---|---|---|---|---|
| Production Example 1 | cladding material A | 35 | — | 47 | 17 | 1 |
| Production Example 2 | cladding material B | 39 | — | 42 | 18 | 1 |
| Production Example 3 | cladding material C | 32 | — | 52 | 15 | 1 |
| Production Example 4 | cladding material D | 35 | — | 46 | 17 | 2 |
| Production Example 5 | cladding material E | 39 | — | 41 | 18 | 2 |
| Production Example 6 | cladding material F | 32 | — | 51 | 15 | 2 |
| Production Example 7 | cladding material G | — | 30 | 51 | 18 | 1 |
| Production Example 8 | cladding material H | 26 | — | — | 72 | 2 |
| Production Example 9 | cladding material I | — | 25 | — | 75 | 1 |

Example 1

Polymethylmethacrylate (PMMA, refractive index of 1.492) was used for a core material and cladding material A (refractive index of 1.417) was used for cladding. The materials were melted and fed to a 225° C. spinning head. The materials were spun through a double-layer concentric conjugate fiber spinning nozzle, and drawn twice as long in a fiber axial direction in a 140° C. hot air oven. Accordingly, a 1.0 mm-diameter optical fiber with a cladding thickness of 10 μm was obtained. The heat resistance (glass transition temperature of the cladding material) and transmission loss of the optical fiber are shown in Table 2.

Examples 2~7, Comparative Examples 1~2

Optical fibers were prepared by conducting procedures the same as in Example 1 except that the type of each cladding material was changed as shown in Table 2. The heat resistance (glass transition temperature of the cladding material) and transmission loss of each optical fiber are shown in Table 2.

Example 8

Polymethylmethacrylate (PMMA, refractive index of 1.492) was used for a core material, cladding material E (refractive index of 1.417) was used for the first cladding layer, and a vinylidene fluoride-tetrafluoroethylene copolymer (repeating unit derived from vinylidene fluoride: repeating unit derived from tetrafluoroethylene=80:20 (molar ratio), refractive index of 1.405) was used for the second cladding layer. The materials were melted and fed to a 225° C. spinning head. The materials were spun through a triple-layer concentric conjugate fiber spinning nozzle and drawn twice as long in a fiber axial direction in a 140° C. hot air oven. Accordingly, a 1.0 mm-diameter optical fiber with a first cladding thickness of 5 μm and a second cladding thickness of 10 μm was obtained. The heat resistance (glass transition temperature of the cladding material (for the first layer)) and transmission loss of the optical fiber are shown in Table 3.

Example 9, Comparative Example 3

Optical fibers were prepared by conducting procedures the same as in Example 8 except that the type of each cladding material (for the first layer) was changed as shown in Table 3. The heat resistance (glass transition temperature of the cladding material (for the first layer)) and transmission loss of each optical fiber are shown in Table 3.

TABLE 2

| | Core Material | | Cladding Material | | | | Optical Fiber transmission loss (dB/km) |
|---|---|---|---|---|---|---|---|
| | type | refractive index | type | refractive index "n" | glass transition temperature Tg (° C.) | 375 × n − 455 | |
| Example 1 | PMMA | 1.492 | cladding material A | 1.417 | 77.4 | 76.375 | 132 |
| Example 2 | PMMA | 1.492 | cladding material B | 1.417 | 76.5 | 76.375 | 134 |
| Example 3 | PMMA | 1.492 | cladding material C | 1.417 | 77.7 | 76.375 | 134 |
| Example 4 | PMMA | 1.492 | cladding material D | 1.417 | 78.2 | 76.375 | 133 |
| Example 5 | PMMA | 1.492 | cladding material E | 1.417 | 77.3 | 76.375 | 132 |
| Example 6 | PMMA | 1.492 | cladding material F | 1.417 | 78.5 | 76.375 | 133 |
| Comp. Example 1 | PMMA | 1.492 | cladding material G | 1.417 | 75.5 | 76.375 | 137 |
| Example 7 | PMMA | 1.492 | cladding material H | 1.465 | 96.2 | 94.375 | 138 |
| Comp. Example 2 | PMMA | 1.492 | cladding material I | 1.465 | 93.4 | 94.375 | 142 |

TABLE 3

| | Core Material | | Cladding Material (first layer) | | | | Cladding Material (second layer) | Optical Fiber transmission |
|---|---|---|---|---|---|---|---|---|
| | type | refractive index | type | refractive index "n" | glass transition temperature Tg (° C.) | 375 × n − 455 | refractive index | loss (dB/km) |
| Example 8 | PMMA | 1.492 | cladding material E | 1.417 | 77.3 | 76.375 | 1.405 | 131 |
| Comp. Example 3 | PMMA | 1.492 | cladding material G | 1.417 | 75.5 | 76.375 | 1.405 | 136 |
| Example 9 | PMMA | 1.492 | cladding material H | 1.465 | 96.2 | 94.375 | 1.405 | 137 |

Optical fibers of the Examples are confirmed to have a lower transmission loss and more excellent heat resistance than optical fibers of the Comparative Examples.

Example 10

Polyethylene resin (PE) was fed to a coating apparatus with a resin coating crosshead die to coat the resin on the periphery of the optical fiber prepared in Example 8. Accordingly, a 0.6 mm-thick jacket layer was formed and a 2.2 mm-diameter optical fiber cable was obtained. The transmission loss and the number of repeated bendings of the optical fiber cable are shown in Table 4.

Examples 11~12, Comparative Examples 4~6

Optical fiber cables were each prepared by conducting the same procedures as in Example 10 except that the types of optical fiber and jacket layer were changed as shown in Table 4. The transmission loss and the number of repeated bendings of each optical fiber cable are shown in Table 4. "CPE" means chlorinated polyethylene and "PA" means polyamide in Table 4.

TABLE 4

| | | | Optical Fiber Cable | |
|---|---|---|---|---|
| | Optical Fiber type | Jacket Layer type | transmission loss (dB/km) | repeated bendings (times) |
| Example 10 | Example 8 | PE | 125 | 50000 |
| Comp. Example 4 | Comp. Example 3 | PE | 128 | 45000 |
| Example 11 | Example 8 | CPE | 126 | 13000 |
| Comp. Example 5 | Comp. Example 3 | CPE | 129 | 9000 |
| Example 12 | Example 8 | PA | 131 | 33000 |
| Comp. Example 6 | Comp. Example 3 | PA | 140 | 31000 |

The present application is based upon and claims the benefit of priority to Japanese Patent Application No. 2014-010042, filed on Jan. 23, 2014. The entire contents of the application are incorporated herein by reference.

So far, the present invention has been described with reference to the embodiments and examples. However, the present invention is not limited to those embodiments and examples. Various modifications in the structure and details of the present invention understandable to a person skilled in the art may be made within the scope of the present invention.

INDUSTRIAL APPLICABILITY

Since optical fibers related to the present invention exhibit excellent heat resistance and meet higher safety standards, they are suitable for use in various applications such as communication equipment, illumination, ornamentation, and displays; especially suitable when used for communications applications.

DESCRIPTION OF NUMERICAL REFERENCES

10 optical fiber
11 core
12 cladding
12a cladding (first layer)
12b cladding (second layer)
12c sheath (sea)

What is claimed is:

1. An optical fiber, comprising:
   a core; and
   at least one cladding layer formed on a periphery of the core,
   wherein the cladding layer comprises a polymer having a repeating unit (A) derived from 2-(perfluorohexyl)ethyl methacrylate.

2. The optical fiber according to claim 1, wherein the polymer forming the cladding layer further contains a repeating unit (B) derived from a fluoroalkyl (meth)acrylate represented by formula (3) below:

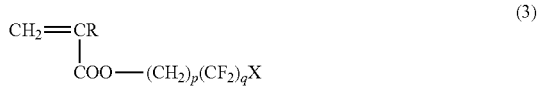

(3)

wherein in formula (3), p is an integer of 1 or 2, q is an integer of 1 to 4, R is a hydrogen atom or a methyl group, and X is a hydrogen atom or fluorine atom.

3. The optical fiber according to claim 1, wherein the polymer forming the cladding layer further comprises a repeating unit (C) derived from an alkyl (meth)acrylate that does not include a fluorine atom.

4. The optical fiber according to claim 1, wherein the polymer forming the cladding layer further comprises a repeating unit (D) derived from a hydrophilic monomer.

5. The optical fiber according to claim 2, wherein the polymer forming the cladding layer comprises the following relative to 100 mass % of the polymer:
   15 to 60 mass % of the repeating unit (A) derived from 2-(perfluorohexyl)ethyl methacrylate,
   20 to 70 mass % of the repeating unit (B) derived from fluoroalkyl (meth)acrylate represented by formula (3),
   10 to 30 mass % of a repeating unit (C) derived from alkyl (meth)acrylate that does not include a fluorine atom, and 0.1-10 mass % of a repeating unit (D) derived from a hydrophilic monomer.

6. The optical fiber according to claim 1, wherein the polymer to form the cladding layer comprises the following relative to 100 mass % of the polymer:
   10 to 50 mass % of the repeating unit (A) derived from 2-(perfluorohexyl)ethyl methacrylate,
   40 to 80 mass % of a repeating unit (C) derived from alkyl (meth)acrylate that does not include a fluorine atom, and
   0.1 to 10 mass % of a repeating unit (D) derived from a hydrophilic monomer.

7. The optical fiber according to claim 4, wherein the polymer forming the cladding layer comprises at least 1.5 mass % of the repeating unit (D) derived from a hydrophilic monomer relative to 100 mass % of the polymer.

8. The optical fiber according to claim 1, wherein the polymer forming the cladding layer has a glass transition temperature (Tg) (° C.) and a refractive index (n) that satisfy formula (4) below:

$$Tg \geq 375 \times n - 455 \quad (4).$$

9. The optical fiber according to claim 1, comprising only one cladding layer.

10. The optical fiber according to claim 1, comprising two or more cladding layers.

11. The optical fiber according to claim 1, comprising one core.

12. The optical fiber according to claim 1, comprising multiple cores.

13. An optical fiber cable, comprising:
   the optical fiber according to claim 1; and
   a jacket layer formed on a periphery of the optical fiber.

14. The optical fiber cable according to claim 13, wherein the jacket layer comprises 50 mass % or greater of a polyolefin resin or a chlorinated polyolefin resin.

15. A communication equipment device, comprising the optical fiber according to claim 1.

16. The optical fiber cable according to claim 4, wherein a monomer forming the repeating unit (D) is selected from the group consisting of (meth)acrylic acid, 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate and glycidyl (meth)acrylate.

17. The optical fiber cable according to claim 10, wherein the cladding layer comprises:
   a first inner layer containing a cladding material comprising the polymer having a repeating unit derived from 2-(perfluorohexyl)ethyl methacrylate, and
   a second layer containing a cladding material having a refractive index lower than that of the first layer.

* * * * *